United States Patent
Wang et al.

(10) Patent No.: US 11,865,823 B2
(45) Date of Patent: Jan. 9, 2024

(54) FLEXIBLE DISPLAY SUBSTRATE, FLEXIBLE DISPLAY DEVICE AND METHOD FOR FABRICATING FLEXIBLE DISPLAY SUBSTRATE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yanxin Wang, Beijing (CN); Zhifeng Zhan, Beijing (CN); Wei Wang, Beijing (CN); Peng Huang, Beijing (CN); Shuquan Yang, Beijing (CN); Jiafan Shi, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/456,705

(22) Filed: Jun. 28, 2019

(65) Prior Publication Data
US 2020/0039176 A1  Feb. 6, 2020

(30) Foreign Application Priority Data

Aug. 2, 2018  (CN) .......................... 201810870324.9

(51) Int. Cl.
*B32B 3/16*  (2006.01)
*B32B 7/12*  (2006.01)
(Continued)

(52) U.S. Cl.
CPC .................. *B32B 3/16* (2013.01); *B32B 7/12* (2013.01); *B32B 37/12* (2013.01); *B32B 38/10* (2013.01); *B32B 2457/20* (2013.01)

(58) Field of Classification Search
CPC ....... B32B 3/16; B32B 2457/206; B32B 7/12; B32B 37/12; B32B 38/10; G09F 9/301; H01L 51/0097; G06F 1/1652
See application file for complete search history.

(56) References Cited

U.S. PATENT DOCUMENTS

2017/0084673 A1* 3/2017 Lee ..................... H01L 51/5237
2017/0200915 A1* 7/2017 Lee ....................... H05K 1/028
2018/0034002 A1  2/2018 Kim et al.

FOREIGN PATENT DOCUMENTS

CN  104885140 A  9/2015
CN  105977400 A  9/2016
(Continued)

OTHER PUBLICATIONS

The First Office Action dated Mar. 26, 2020 corresponding to Chinese application No. 201810870324.9.

(Continued)

*Primary Examiner* — Catherine A. Simone
(74) *Attorney, Agent, or Firm* — Nath, Goldberg & Meyer; Joshua B. Goldberg

(57) ABSTRACT

A flexible display substrate, a flexible display device, and a method of fabricating a flexible display substrate are provided. The flexible display substrate includes: a back plate including a display area which include a bending area and a non-bending area; and a back film layer disposed on the back plate and including a first sub-back film layer and a second sub-back film layer, wherein the first sub-back film layer is (Continued)

disposed on the non-bending area, and the second sub-back film layer is disposed on the bending area and covers a portion of the bending area.

13 Claims, 4 Drawing Sheets

(51) Int. Cl.
*B32B 37/12* (2006.01)
*B32B 38/10* (2006.01)

(56) References Cited

FOREIGN PATENT DOCUMENTS

| CN | 106856206 A | 6/2017 |
|---|---|---|
| CN | 108230907 A | 6/2018 |
| CN | 108305880 A | 7/2018 |

OTHER PUBLICATIONS

Office Action dated Jan. 27, 2021 for application No. CN201810870324.9 with English translation attached.

\* cited by examiner

FLEXIBLE DISPLAY SUBSTRATE, FLEXIBLE DISPLAY DEVICE AND METHOD FOR FABRICATING FLEXIBLE DISPLAY SUBSTRATE

CROSS-REFERENCE TO RELATED APPLICATIONS

The present application claims the priority of Chinese Patent Application No. 201810870324.9, filed on Aug. 2, 2018, the contents of which are incorporated herein in their entirety by reference.

TECHNICAL FIELD

The present application relates to a field of display technologies, and particularly, to a flexible display substrate, a flexible display device, and a method of fabricating a flexible display substrate.

BACKGROUND

A flexible display panel has a bending area and a non-bending area. When the bending area is bent, a back film disposed on a side of the flexible display panel distal to a display surface would cause a large stress on a metal wire in the bending area, and thus the metal wire would be broken.

Therefore, in some cases, the back film is usually not provided in the bending area.

SUMMARY

The present disclosure provides a flexible display substrate, including: a back plate including a display area which include a bending area and a non-bending area; and a back film layer disposed on the back plate and including a first sub-back film layer and a second sub-back film layer, wherein the first sub-back film layer is disposed on the non-bending area, and the second sub-back film layer is disposed on the bending area and covers a portion of the bending area.

In an embodiment, the second sub-back film layer includes a plurality of spaced back film members.

In an embodiment, the second sub-back film layer extends along a first direction in the bending area.

In an embodiment, a hardness of the second sub-back film layer is higher than a hardness of the first sub-back film layer.

In an embodiment, a shape of the back film members include at least one of a straight line, a curved line, an irregular line, a diamond shape, a rectangle, a triangle, and an irregular closed shape.

In an embodiment, the back film members are disposed at both ends of the bending area in a second direction perpendicular to the first direction.

In an embodiment, the back film members are uniformly disposed in the bending area in a second direction perpendicular to the first direction.

In an embodiment, the shape of the back film members is discontinuous.

In an embodiment, the first sub-back film layer and the second sub-back film layer are integrally formed.

In an embodiment, the flexible display substrate further includes an adhesive layer disposed between the back plate and the first sub-back film layer and between the back plate and the second sub-back film layer.

In an embodiment, the adhesive layer includes a pressure sensitive adhesive.

The present disclosure provides a flexible display device, including the flexible display substrate of the embodiments above.

The present disclosure provides a method of fabricating a flexible display substrate, including: forming a back film layer on a back plate by employing a first manner or a second manner, wherein the first manner includes attaching a first sub-back film layer to an non-bending area of a display area of the back panel, and attaching a patterned second sub-back film layer to a portion of a bending area of the display area, and the second manner includes coating an adhesive layer and the back film layer on entire surface of the back plate, and removing a portion of the back film layer on the bending area by laser to form the patterned second sub-back layer in the bending area.

In an embodiment, in the first manner, the attaching is performed by an adhesive layer, and in the second manner, the adhesive layer between the back plate and the first sub-back film layer and between the back plate and the second sub-back film layer is retained when performing the removing by laser, wherein, the adhesive layer includes a pressure sensitive adhesive.

In an embodiment, a hardness of the second sub-back film layer is higher than a hardness of the first sub-back film layer.

In an embodiment, the patterned second sub-back film layer includes a plurality of spaced back film members.

In an embodiment, the patterned second sub-back film layer extends along a first direction in the bending area.

In an embodiment, a shape of the back film members include at least one of a straight line, a curved line, an irregular line, a diamond shape, a rectangle, a triangle, and an irregular closed shape.

In an embodiment, the back film members are disposed by one of: disposing at both ends of the bending area in a second direction perpendicular to the first direction; and disposing uniformly in the bending area in a second direction perpendicular to the first direction.

In an embodiment, the shape of the back film members is discontinuous.

DETAILED DESCRIPTION

The present disclosure will be further described in detail below in conjunction with the drawings and specific embodiments.

As described above, though stress caused by a back film is reduced in the bending area in a case where the back film is not disposed at the bending area, the bending area becomes very vulnerable, causing the bending area easily subject to sudden bending due to collision by external force during installation, transportation and use, such that the metal wire may break.

In addition, since the back film is not provided in the bending area while it is disposed in the non-bending area, there is a large step difference at a boundary between the bending area and the non-bending area. Generally, the material of the back film is harder than that of the flexible display panel. Therefore, during a bending process, the back film at the boundary easily becomes a center of the bending, which causes pressing between the bending area and the back film, and in this case, the back film applies a large stress to the metal wire in the bending area, causing the wire to be broken.

Figure 1:
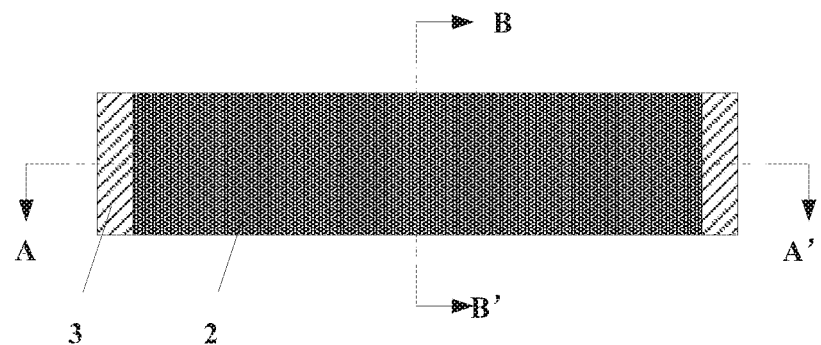
FIG. 1 is a schematic view illustrating back film strips disposed at both ends of a bending area according to an embodiment of the present disclosure.
Figure 2:
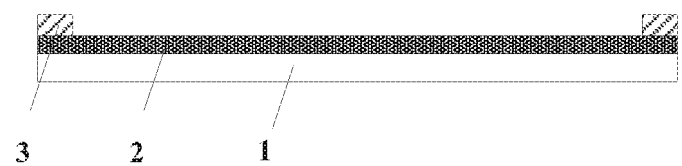
FIG. 2 is a cross-sectional view taken along line A-A' of FIG. 1 according to an embodiment of the present disclosure.
Figure 3:
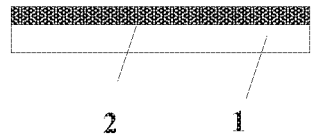
FIG. 3 is a cross-sectional view taken along line B-B' of FIG. 1 according to an embodiment of the present disclosure.

In this regard, as shown in FIG. 1-3, an embodiment of the present disclosure provides a flexible display substrate, including: a back plate 1 including a display area (not shown) that includes a non-bending area (not shown) and a bending area. The back plate 1 further includes a back film layer disposed on the back plate 1, the back film layer includes a first sub-back film layer and a second sub-back film layer, the first sub-back film layer is disposed in a non-bending area, the second sub-back film layer is disposed in the bending area, and the second sub-back film layer covers a portion of the bending area.

In an embodiment, a hardness of the second sub-back film layer may be higher than a hardness of the back plate and a hardness of the first sub-back film layer.

In the flexible display substrate, since the second sub-back film layer is disposed in the bending area, and the material of the second sub-back film layer is generally hard, the second sub-back film layer can support the bending area to make it in an unfolded state. Therefore, when the back plate 1 is installed and transported, and the bending area does not need to be bent, if the bending area of the back plate 1 is subjected to an external force, the second sub-back film layer can prevent the bending area from being bent by supporting the bending area, thereby solving a problem of metal wire breakage due to the bending of the bending area under impact of the external force in some cases, and the bending performance of the bending area is improved. In addition, since the second sub-back film layer is merely disposed on a portion of the bending area, the second sub-back film layer would not affect the bending of the bending area when the bending area needs to be bent to a back of the display area.

In an embodiment, the second sub-back film layer may include a plurality of spaced back film members. The back film members may include a back film strip and a back film pattern.

In an embodiment, the second sub-back film layer may include a plurality of spaced back film strips 3. In an embodiment, the back film strip 3 extends in a first direction, such as the BB' direction shown in FIG. 1, i.e., a bendable direction of the bending area.

Specifically, when the back plate 1 is installed and transported, if the bending area of the back plate 1 is about to be bent by an external force, the plurality of back film strips 3 can respectively support the corresponding bending areas to resist external pressure, thereby avoiding breakage of the metal wire caused by a large degree of bending in the bending area, and improving the bending performance and the pressure resistance of the bending area.

Figure 12:
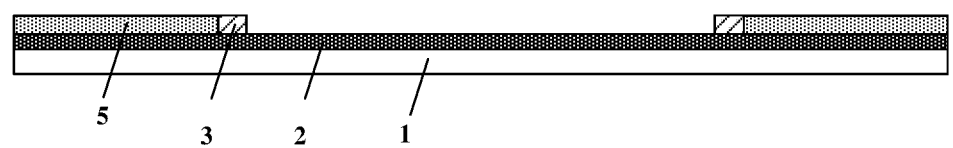
FIG. 12 is a cross-sectional view of a flexible display substrate based on FIG. 2 to illustrate that the first sub-back film layer is connected to the second sub-back film layer according to an embodiment of the present disclosure.

In an embodiment, the plurality of back film strips 3 may be disposed at both ends of the bending area in a second direction that is perpendicular to the first direction. For example, the second direction may be the AA' direction shown in FIG. 1. Specifically, as shown in FIG. 1 and FIG. 2, two ends of the bending area are respectively provided with a back film strip 3 for supporting the bending area in a case of the bending area is collided by external force. The two back film strips 3 may be connected to the first sub-back film layer 5, as shown in FIG. 12.

Figure 4:
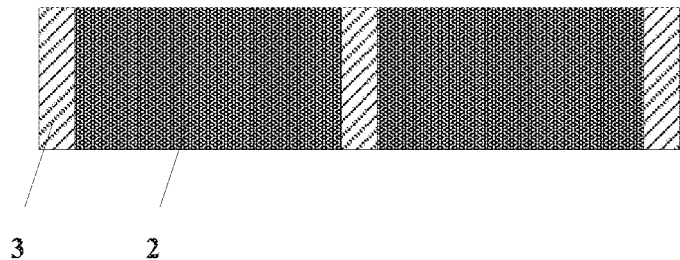
FIG. 4 is a schematic view illustrating back film strips disposed at both ends and an central portion of the bending area according to an embodiment of the present disclosure.

In an embodiment, the plurality of back film strips 3 may be disposed at both ends and a central region of the bending area in the second direction. Specifically, as shown in FIG. 4, two ends of the bending area are respectively provided with a back film strip 3, and the central region of the bending area is further provided with a back film strip 3 for supporting the bending area in a case of the bending area is collided by external force. The three back film strips 3 may be connected to the first sub-back film layer.

Figure 5:
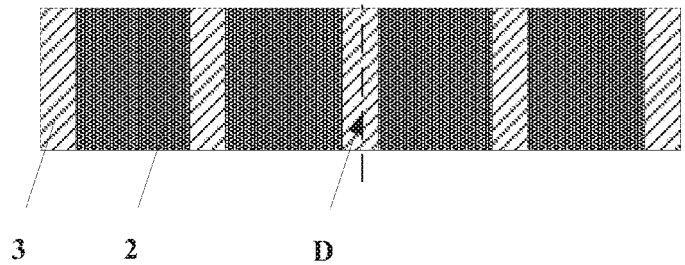
FIG. 5 is a schematic view illustrating back film strips uniformly disposed in the bending area according to an embodiment of the present disclosure.

In an embodiment, as shown in FIG. 5, the bending area may be uniformly distributed with five back film strips 3 which are symmetrical relative to a central axis of the bending area (dashed line D in FIG. 5). Specifically, the above five back film strips 3 may be respectively referred to as a first back film strip and a second back film strip located on a left side of the bending area, a fourth back film strip and a fifth back film strip located on a right side of the bending area, and a third back film strip located in the central region, wherein the first back film strip and the second back film strip are respectively symmetric with the fourth back film strip and the fifth back film strip relative to the central axis, and a central axis of the third back film strip coincides with the central axis of the bending area. Such structural arrangement makes the bending area being stressed more uniformly, so that when the bending area does not need to be bent, the bending area is prevented from being unexpectedly bent by the external force, avoiding wire breakage caused thereby. Of course, such structural arrangement can prevent the bending area from being unexpectedly bent under impact of external force, but when the bending area needs to be bent to, for example, the back of the display area, the reaction force generated by the five back film strips 3 is small and does not affect normal bending of the bending area.

It should be noted that the number of the back film strips 3 on the bending area is not limited to two, three or five as described above, and the plurality of back film strips 3 may be uniformly or non-uniformly disposed in the bending area. The number of the back film strips 3 may be set according to specific size of the bending area, and is not limited herein.

Figure 7:
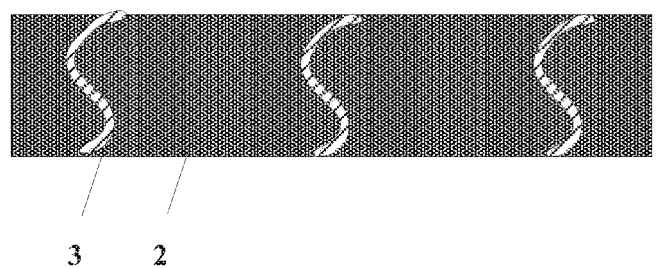
FIG. 7 is a schematic view illustrating back film strips in a shape of a curved line disposed in the bending area according to an embodiment of the present disclosure.

While the back film strip 3 is shown and described as being a straight line, it should be understood that a shape of the back film strip 3 may also include a curved line. Such arrangement can disperse a force applied to the backing strips 3 from outside. For example, as shown in FIG. 7, the back film strips 3 in a shape of a curved line can decompose the force it receives into two directions perpendicular to each other (for example, a first direction and a second direction), thereby alleviating an impact of bending, preventing metal wire breakage, and enhancing the bending performance of flexible display substrates.

Figure 6:
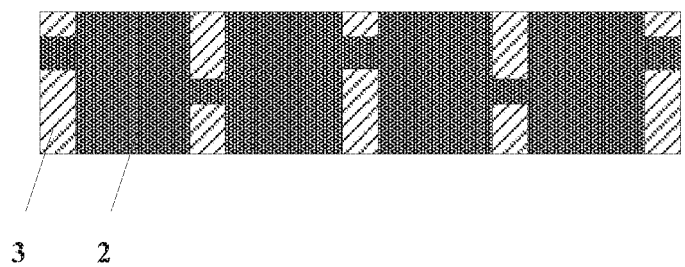
FIG. 6 is a schematic view illustrating back film strips in a shape of discontinuous line disposed in the bending area according to an embodiment of the present disclosure.

Though the back film strip 3 is shown and described as being continuous above, it should be understood that the back film strip 3 may also be discontinuous, as shown in FIG. 6. The back strip 3 may also be a discontinuous curve.

Figure 8:
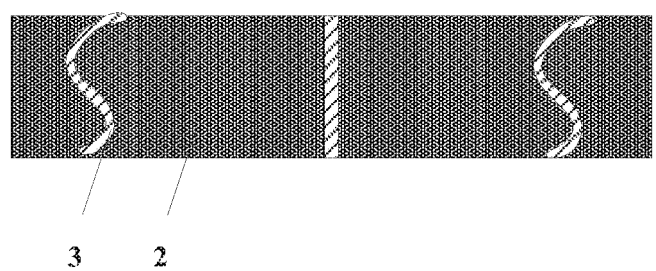
FIG. 8 is a schematic view illustrating back film strips in a shape of a curved line and in a shape of straight line disposed in the bending area according to an embodiment of the present disclosure.
Figure 9:
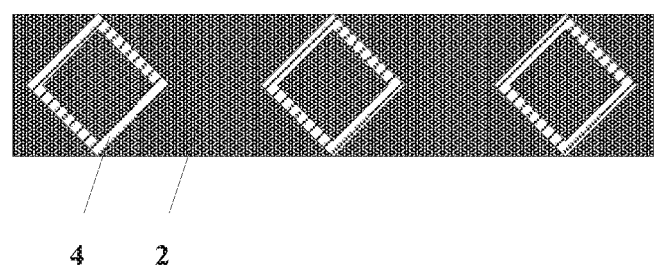
FIG. 9 is a schematic view illustrating back film patterns disposed in the bending area according to an embodiment of the present disclosure.

Of course, the shape of the plurality of back film strips 3 disposed in the bending area may be various. Specifically, as shown in FIG. 8, the back film strips 3 in a shape of curved line may be provided at both ends of the bending area, and the back film strip 3 in a shape of straight line may be provided at a central region of the bending area.

In an embodiment, the second sub-back film layer may further include a plurality of spaced back film patterns 4. The back film pattern 4 may be in a shape of a diamond, a rectangle, a triangle, or the like. The shape of the plurality of back film patterns 4 disposed in the bending area may be various. Of course, the shape of the back film pattern 4 may also be other regular patterns or irregular patterns, which will not be enumerated here.

It should be noted that the material, the installation position and the function of the back film pattern 4 may be same as those of the back film strips 3 in the above embodiments, and details thereof will not be described herein again.

Figure 13:
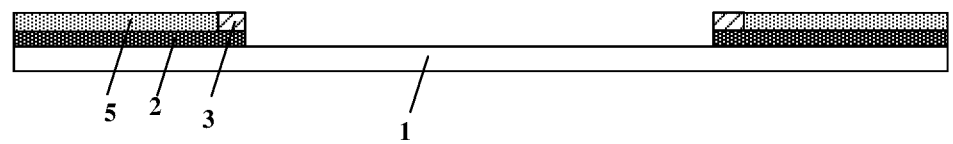
FIG. 13 is a cross-sectional view of a flexible display substrate based on FIG. 11 to illustrate that the first sub-back film layer is connected to the second sub-back film layer according to an embodiment of the present disclosure.

In an embodiment, the first sub-back film layer 5 and the second sub-back film layer are integrally formed, as shown in FIGS. 12 and 13, and in this case, there is no gap at the boundary between the first sub-back film layer and the second sub-back film layer, that is, there is no step difference at the boundary between the display area and the bending area, thereby solving the problem that the first sub-back film layer and the bending area at the boundary may squeeze each other due to the step difference, causing a problem of the metal line breakage in some cases.

In an embodiment, the flexible display substrate is further provided with an adhesive layer 2 disposed between the back plate 1 and the first sub-back film layer and between the back plate 1 and the second sub-back film layer, for bonding the first sub-back film layer and the second sub-back film layer to a surface of the back plate 1.

The adhesive layer 2 may include a pressure sensitive adhesive. Of course, the adhesive layer 2 may also be any other suitable adhesive material capable of bonding the first sub-back film layer and the second sub-back film layer to the back plate 1, which is not limited herein.

In summary, a plurality of back film strips 3 or a plurality of back film patterns 4 may be disposed in the bending area, and the material of the back film strip 3 or the back film pattern 4 is generally hard. Therefore, when the bending area does not need to be bent, the plurality of back film strips 3 or the plurality of back film patterns 4 can support the bending area to make it in an unfolded state; when the back plate 1 is installed and transported, the plurality of back film strips 3 or the plurality of back film patterns 4 can prevent the bending area from being unexpectedly bent by supporting the bending area, thereby solving a problem of metal wire breakage due to the unexpected bending of the bending area under impact of the external force, and improving the bending performance of the bending area. In addition, since the second sub-back film layer are merely disposed in a portion of the bending area, the plurality of back film strips 3 or the plurality of back film patterns 4 would not generate a large reaction force when the bending area needs to be bent to the back of the display area, that is, would not affect the bending of the bending area.

The present disclosure further provides a method for fabricating a flexible display substrate (not shown), the method may include a step of forming a back film layer on the back plate 1 in a first manner or a second manner.

Specifically, the first manner (for example, an attaching manner) may include: attaching a first sub-back film layer to an non-bending area of a display area of the back panel, and attaching a patterned second sub-back film layer to a portion of a bending area of the display area. In addition, the first sub-back film layer and the second sub-back film layer may be attached to the non-bending area and the bending area of the display area by the adhesive layer 2, respectively. The adhesive layer 2 can be a pressure sensitive adhesive.

The second manner (for example, a laser manner) may include: coating an adhesive layer and the back film layer on entire surface of the back plate 1, and removing a portion of the back film layer on the bending area by laser to form the patterned second sub-back layer in the bending area.

In an embodiment, a hardness of the second sub-back layer may be formed to be higher than a hardness of the back plate and a hardness of the first sub-back layer.

The second sub-back film layer shown in FIGS. 1 to 9 may be formed by a laser manner. It can be seen that when a portion of the back film layer in the bending area is removed by laser, merely the back film layer may be removed or the back film layer and a portion of the adhesive layer 2 may be removed, in order to avoid damage to the back plate 1 by laser. That is, after the second sub-back film layer is formed by laser in the bending area, the adhesive layer 2 may remain in the bending area.

Figure 10:
FIG. 10 is a schematic view illustrating a bending area after forming a second sub-back film layer by attachment according to an embodiment of the present disclosure.
Figure 11:
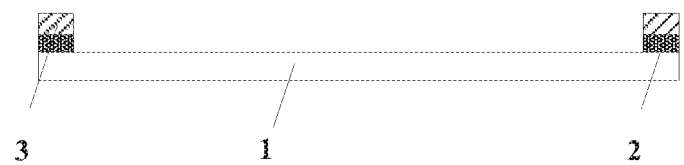
FIG. 11 is a cross-sectional view taken along line C-C' in FIG. 10 according to an embodiment of the present disclosure.

FIG. 10 and FIG. 11 may be schematic views illustrating a bending area after the second sub-back film layer is formed in the bending area by the attaching manner. It can be clearly seen from FIGS. 10 and 11 that since the second sub-back film layer is attached to the bending area by the adhesive layer 2, there is no adhesive layer 2 in the bending area of the back film layer where the second sub-layer is not disposed, after the second sub-film layer is formed by attaching.

The above method of fabricating a flexible display substrate can fabricate a flexible display substrate as in the embodiments described above in connection with FIGS. 1-11, the specific configuration of which has been described above, and will not be described herein again.

The present disclosure further provides a flexible display device including the flexible display substrate described in the above embodiments.

Since the bending performance and the compressive performance of the above flexible display substrate included in the flexible display device are good, service life of the flexible display device can be extended.

It is to be understood that the above embodiments and examples are merely exemplary embodiments employed to explain the principles of the present disclosure, and the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A flexible display substrate, comprising:
    a back plate comprising a display area, which comprises a bending area and a non-bending area; and
    a back film layer disposed on the back plate and comprising a first sub-back film layer and a second sub-back film layer, wherein the first sub-back film layer is disposed on the non-bending area, and the second sub-back film layer is disposed on the bending area and covers a portion of the bending area,
    wherein the second sub-back film layer extends along a first direction in the bending area, the second sub-back film layer only comprises two spaced back film members, which are arranged at two ends of the bending area in a second direction perpendicular to the first direction, respectively, no other back film member is provided between the two spaced back film members, and each of the two spaced back film members is connected to the first sub-back film layer and has a hardness higher than a hardness of the first sub-back film layer.

2. The flexible display substrate of claim 1, wherein a shape of the two spaced back film members comprises at least one of a straight line, a curved line, an irregular line, a diamond, a rectangle, a triangle, and an irregular closed shape.

3. The flexible display substrate of claim 2, wherein the shape of the two spaced back film members is discontinuous.

4. The flexible display substrate of claim 1, wherein the first sub-back film layer and the second sub-back film layer are integrally formed.

5. The flexible display substrate of claim 1, further comprising an adhesive layer disposed between the back plate and the first sub-back film layer and between the back plate and the second sub-back film layer.

6. The flexible display substrate of claim 5, wherein the adhesive layer comprises a pressure sensitive adhesive.

7. A flexible display device, comprising the flexible display substrate of claim 1.

8. The flexible display substrate of claim 6, wherein an orthographic projection of at least a portion of the adhesive layer on the back plate does not overlap with an orthographic projection of the two spaced back film members on the back plate.

9. The flexible display substrate of claim 6, wherein an orthographic projection of the adhesive layer on the back plate completely overlaps with an orthographic projection of the two spaced back film members on the back plate.

10. A method of fabricating a flexible display substrate, comprising:
    forming a back film layer on a back plate by employing a first manner or a second manner such that the back plate comprising a display area, which comprises a bending area and a non-bending area; and the back film layer disposed on the back plate and comprising a first sub-back film layer and a second sub-back film layer, wherein the first sub-back film layer is disposed on the non-bending area, and the second sub-back film layer is disposed on the bending area and covers a portion of the bending area, wherein
    the first manner comprises attaching the first sub-back film layer to a non-bending area of a display area of the back plate, and attaching a patterned second sub-back film layer to a portion of a bending area of the display area, and
    the second manner comprises coating an adhesive layer and the back film layer on an entire surface of the back plate, and removing a portion of the back film layer on the bending area by laser to form the patterned second sub-back film layer in the bending area and the first sub-back film layer in the non-bending area,
    wherein the second sub-back film layer extends along a first direction in the bending area, the second sub-back film layer only comprises two spaced back film members, which are arranged at two ends of the bending area in a second direction perpendicular to the first direction, respectively, no other back film member is provided between the two spaced back film members, and each of the two spaced back film members is connected to the first sub-back film layer and has a hardness higher than a hardness of the first sub-back film layer.

11. The method of claim 10, wherein
    in the first manner, the attaching is performed by an adhesive layer, and
    in the second manner, the adhesive layer between the back plate and the first sub-back film layer and between the back plate and the second sub-back film layer is retained when performing the removing by laser,
    wherein the adhesive layer comprises a pressure sensitive adhesive.

12. The method of claim 11, wherein a shape of the two spaced back film members comprises at least one of a straight line, a curved line, an irregular line, a diamond, a rectangle, a triangle, and an irregular closed shape.

13. The method of claim 12, wherein the shape of at least one of the back film members is discontinuous.

* * * * *